Dec. 17, 1935.　　　　E. FIELD　　　　2,024,349
LEAKPROOF PRESSURE VALVE
Filed July 30, 1934
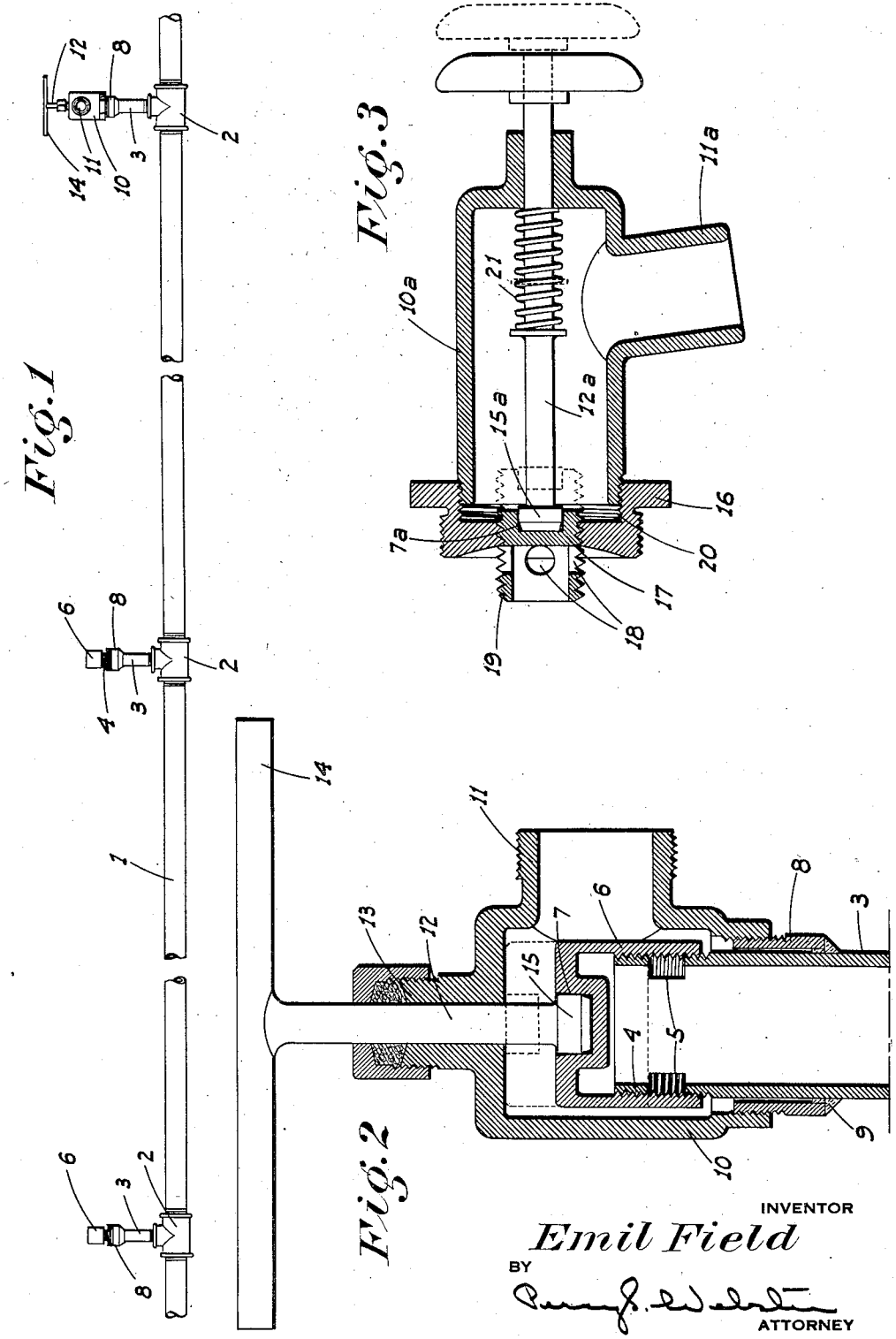
INVENTOR
*Emil Field*
BY
ATTORNEY Patented Dec. 17, 1935

2,024,349

UNITED STATES PATENT OFFICE 2,024,349

LEAKPROOF PRESSURE VALVE

Emil Field, Stockton, Calif., assignor of one-half to Andrew H. Fredrickson, Stockton, Calif.

Application July 30, 1934, Serial No. 737,633

1 Claim. (Cl. 251—35)

This invention relates to control and shut-off valves for use in connection with liquid or air pressures; the present application being a continuation in part of my copending application Serial No. 671,347, filed May 16, 1933.

The principal object of my invention is to provide a leak-proof pressure tight valve member suitable for different uses, and a cooperating valve operating and flow control unit adapted to be removably associated with the valve. The valve itself is constructed so that there is nothing to wear out, leak or otherwise give trouble, corrosion or deterioration of the material as is frequently the case with the ordinary form of valve.

One very important use for my improved valve structure is in connection with the temporary water pipe lines which are laid along the right of way of highways etc. under construction, to provide water for the workmen as well as for the various constructional activities. Such activities are usually spread out along a considerable distance, and if only a single control valve is interposed in the pipe line at a certain point, inconvenience and loss of time results in drawing water for all needs from this one outlet. If on the other hand a number of valves are used at various points along the pipe line, considerable expense to the contractor is ordinarily entailed since the present type of valve suitable for the relatively high pressure and of the large size required is quite expensive.

My improved device adapts itself to this service with a minimum of expense, since the permanent unit of the structure is very simple and inexpensive, and a single operating unit, which is also of very simple nature can be used with all the permanent units selectively. As the work advances and the pipe line is extended other permanent units are mounted in the line, using the same removable operating units used on the previous permanent units. These latter may be left in the line where they are always available if wanted, but if they are never again needed no great expense is entailed in their discarding.

Another use for my improved device with but little modification is for gas and oil drums. In this service the standard drum plug is made use of as a part of the permanent unit, and the valve when closed and the operating unit removed does not project outwardly of the plug. There is therefore no danger of the valve being damaged as is the case with the usual protruding valve or faucet and the theft of the liquid by drawing the same off is at least rendered more difficult.

These objects I accomplish by means of such structure and relative arrangement of parts as will fully appear by a perusal of the following specification and claim.

In the drawing similar characters of reference indicate corresponding parts in the several views:

Figure 1 is a side outline of a portion of a pipe line showing a number of permanent valve units interposed therein, and a removable operating and control unit mounted in one of the permanent units.

Figure 2 is a sectional elevation of one of the valve units as connected together for operation.

Figure 3 is a sectional elevation of a drum type valve structure.

Referring now more particularly to the characters of reference on the drawing, and particularly at present to Figures 1 and 2, the numeral 1 denotes a main pipe line having T fittings 2 at intervals in which the permanent units of my improved valve are mounted. Each such permanent unit comprises an upstanding pipe nipple 3 secured in the corresponding T. At its upper end the nipple is provided with exterior pipe threads 4 and with opposed side openings 5 intermediate the ends of the threaded portion. A tapped cap 6 forming the valve engages the threaded portion 4 of the nipple so as to cover the openings 5 when the cap is screwed down tight; said cap being provided with a central top socket 7 preferably of square form. By means of the cap and the use of pipe threads it is evident that when the cap is screwed down tight no leakage can occur either through the side openings or from the top of the nipple even though the latter is clear of the top of the cap and the use of gaskets to maintain a watertight seal is unnecessary.

An externally threaded collar 8 is secured on the nipple concentric with and below the threaded portion 4, said collar being preferably a larger piece of pipe welded to the nipple as at 9. The above parts constitute a permanent unit and as will be evident may be very cheaply constructed and will securely hold the water in the line regardless of the pressure therein.

The removable valve operating and flow control unit comprises a body 10 tapped at its lower end to removably screw onto the collar 8. The body above the collar is of larger internal diameter than the cap so as to clear the same and permit of an unrestricted flow of water from the openings 5 when the cap is raised. The top of the body extends above the cap a sufficient distance to enable the latter to be raised so as to fully expose the openings 5 before the upward movement of the cap is limited by the engagement of the same with the top of the body. Such limit of movement leaves the cap still engaged with the nipple so that it is impossible for the cap to come off while surrounded by the body.

The body is provided with a side outlet 11 preferably threaded at its outer end for connection to a hose coupling or the like if desired. A positive guided or controlled flow means for the water when the valve cap is open is thus provided. The cap is turned to open or close the same by a stem 12 turnably mounted in and projecting through a packing gland 13 on top of the body, the stem having a suitable operating handle 14 permanently mounted on its upper end. The stem is axially alined with the valve cap and of course with the body and with the nipple and has a head 15 permanently mounted on its lower end formed similar in shape to the socket 7 to removably engage the same. The head is preferably tapered or beveled at its lower end so as to facilitate its entry into the socket.

The head is larger than the stem itself so that the latter can never be removed from the body when once assembled and thus preventing possible loss of the same. The stem is slidable as well as turnable in the packing gland so that it can be lowered to engage the cap socket after the body is once secured on the collar.

It will thus be seen that there is no permanent connection between the body and the nipple or between the operating stem and the valve cap, and the removable unit may be associated with or removed from the permanent unit by a simple screwing or unscrewing operation, without removing the stem from the removable unit. It is not even necessary to raise the stem clear of the valve cap when the body is being removed since the latter can turn about the stem without imparting any valve loosening rotation thereto. Very quick action may therefore be had.

The type of valve structure for drum use has all the advantages of that described but the construction, particularly of the permanent unit, is necessarily somewhat different. In this case I use a standard drum plug 16 as the body or main member of the permanent unit, and the valve mounted therein is in the form of a threaded plug 17, which is cupped from its inner end and screwed into a tapped hole formed centrally of the plug. The drum plug is thus in effect the same as the nipple passage member of the first described type, while the valve plug is substantially the same as the valve cap. The valve member 17 is provided with radial ports 18 communicating with the interior of the cupped portion. These openings are disposed inwardly of the drum plug when the valve is tightly closed and are outwardly of the same when the valve is turned to a fully opened position.

The outermost threads of the valve are formed as pipe threads or are relatively shallow so that they will firmly wedge into the threads of the drum plug and prevent a continuous movement of the valve inwardly through the drum plug as well as providing a positive leak-tight joint. At the inner end of the valve a thread thereof is turned over or mutilated as shown at 19 to prevent removal of the valve when once it is mounted in place.

The removable unit of this valve is substantially the same as that first described and comprises a body 10a having a radial outlet 11a toward its outer end. The body is threaded at one end for engagement with a tapped depression 20 in the outer face of the drum plug so that the body is axially alined with the valve. The valve operating stem 12a is turnably and slidably mounted in the body axially of the valve and has an enlarged head 15a on its inner end for removable engagement with a socket 7a in the valve.

For drum service the valve is set with its axis horizontal and the weight of the valve operating stem will not therefore act to hold the head 15a engaged with the valve. Since it is desired that a positive and quick closing of the valve shall be had to prevent spilling of the oil or gas, I provide a compression spring 21 on the valve operating stem 12a which acts to yieldably hold the head 15a in constant engagement with the valve socket. At the same time this spring does of course prevent an intentional disengagement of the head from the valve when it is desired to remove the removable unit. With this type of device also a simple screwing or unscrewing operation is all that is necessary to connect or disconnect the removable unit with the permanent unit and the valve operating stem is never removed from the body.

When the body is removed from the drum plug the valve is countersunk in said plug so that there is no danger of its being damaged even though the drum is rolled along the ground. The device is made adaptable to standard drum plugs merely by tapping the latter to provide a valve opening and to provide for the mounting of the body, without any change or further work on the plug being necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention what I claim as new and useful and desire to secure by Letters Patent is:

A valve structure consisting of permanent and removable units, the permanent unit comprising a drum plug having a tapped axial opening in its bottom web, and a plug forming a valve screwed into the opening and arranged to provide for a flow of fluid from the inner to the outer side of the web without the plug being removed from the web when said plug is unscrewed a certain distance from a predetermined position; the removable unit comprising a flow directing passage body to be removably screwed into the drum plug from the outside and in concentric relation with the valve plug, an operating stem slidably and turnably mounted in the body axially thereof and of the valve plug, an element on the inner end of the stem to releasably engage the outer end of the plug in non-turning relation by a movement of the stem in an axial direction toward the plug, and a spring mounted in connection with and acting on the stem to move the same axially and toward the valve plug to maintain the stem element engaged with the valve plug without interfering with an intentional release of said element from the valve plug.

EMIL FIELD.